(12) United States Patent
Gilevich et al.

(10) Patent No.: US 7,970,102 B2
(45) Date of Patent: Jun. 28, 2011

(54) APPARATUS AND METHOD FOR DETECTING FOREIGN MATERIALS IN A CONTAINER

(75) Inventors: Alexander I. Gilevich, Sunnyvale, CA (US); Francis Allan Anderson, San Fransisco, CA (US)

(73) Assignee: InspX LLC, Fremont, CA (US)

( * ) Notice: Subject to any disclaimer, the term of this patent is extended or adjusted under 35 U.S.C. 154(b) by 202 days.

(21) Appl. No.: 12/220,574

(22) Filed: Jul. 24, 2008

(65) Prior Publication Data

US 2010/0020927 A1   Jan. 28, 2010

(51) Int. Cl.
*G01N 23/04* (2006.01)
(52) U.S. Cl. .............................. 378/57; 378/58; 378/62
(58) Field of Classification Search .................... 378/57, 378/58, 62, 193, 195
See application file for complete search history.

(56) References Cited

U.S. PATENT DOCUMENTS

| | | | |
|---|---|---|---|
| 6,005,912 A | 12/1999 | Ocleppo | |
| 7,106,827 B2 | 9/2006 | Heuft et al. | |
| 7,145,980 B2 | 12/2006 | Sakaguchi et al. | |
| 7,164,750 B2 | 1/2007 | Nabors et al. | |
| 2008/0043917 A1 | 2/2008 | Oreper et al. | |

FOREIGN PATENT DOCUMENTS

| | | |
|---|---|---|
| EP | 0 077 939 A | 5/1983 |
| FR | 2 681 950 A | 4/1993 |
| JP | 2000 241368 A | 9/2000 |
| JP | 2007120997 A2 | 5/2007 |

*Primary Examiner* — Jurie Yun
(74) *Attorney, Agent, or Firm* — Mark A. Bauman

(57) ABSTRACT

The present invention is an apparatus and method for detecting foreign material in containers in a product stream. Two X-ray emitters and two sensor arrays are positioned in a constellation to improve the detection of foreign material. A first x-ray emitter is positioned so that it projects an x-ray beam in a downward manner through the product stream. A second x-ray emitter is positioned so that it projects an x-ray beam in an upward manner through the product stream. Two sensor arrays are each positioned in receiving relation to each of the x-ray beams to receive and provide signals from each of the beams after they have interacted with the product stream. Signals from each of the two sensor arrays are processed and compared with user defined thresholds to detect and indicate the presence of foreign material in containers.

12 Claims, 8 Drawing Sheets

APPARATUS AND METHOD FOR DETECTING FOREIGN MATERIALS IN A CONTAINER

TECHNICAL FIELD

The present invention relates to an apparatus and method for identifying foreign materials in a container.

BACKGROUND OF THE INVENTION

For many years, the food industry has employed x-ray scanning devices and detectors to inspect cans or containers for foreign or undesirable material to ensure the safety and quality of their products. Often, each type of container presents its own unique challenges for optimizing the accuracy of the detection of foreign material. Containers are built using a variety of materials, and come in many shapes and sizes.

One device in the art that has been specifically optimized for the detection of foreign material within a bottle is disclosed in U.S. Pat. No. 7,106,827. Here the invention utilizes one or two X-ray sources and one detector array positioned so that some of the x-rays travel in a direction that is approximately tangential to a maximum slope of a bulge of on a bottom of a container.

Such an approach, however, is of limited use when detecting foreign material in containers such as cans. Here, various features of the cans including seams, pull-tops and folds can confound the detection process, and decrease the overall effectiveness of an apparatus.

So, what is needed is an apparatus and method for detecting foreign material in a container including cans which can effectively identify and detect foreign material despite confounding features of the container such as seams, pull-tops and folds.

SUMMARY OF THE INVENTION

A first aspect of the present invention is to provide an apparatus for detecting the presence of a foreign object in a container with a top surface that is positioned in a first horizontal plane, and a bottom surface that is positioned in a second horizontal plane. The apparatus includes a conveyor configured to transport the container, and a first x-ray emitter located proximate to the first horizontal plane, and configured to project a first diverging x-ray beam in a first vertical plane through the container, and a first sensor array positioned in receiving relation to the first x-ray beam after the first x-ray beam has interacted with the container. The apparatus also includes a second x-ray emitter located proximate to the second horizontal plane, and configured to project a second diverging x-ray beam in a second vertical plane through the container, and a second sensor array positioned in receiving relation to the second x-ray beam after the second x-ray beam has interacted with the container, and wherein the first and second vertical planes are oriented in non-parallel relation.

Another aspect of the invention is a method for detecting the presence of a foreign object in a container, which includes providing a container having a top surface bound by a first horizontal plane and a bottom surface bound by a second horizontal plane, and providing a first x-ray emitter located proximate to the first horizontal plane, and providing a second x-ray emitter located proximate to the second horizontal plane. The method further includes transporting the container, and directing a first x-ray beam from the first x-ray emitter in a first vertical plane, and toward the second horizontal plane in a diverging manner; and directing a second x-ray beam from the second x-ray emitter in a second vertical plane, and toward the first horizontal plane in a diverging manner.

These and other aspects of the present invention will be discussed in greater detail hereinafter.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
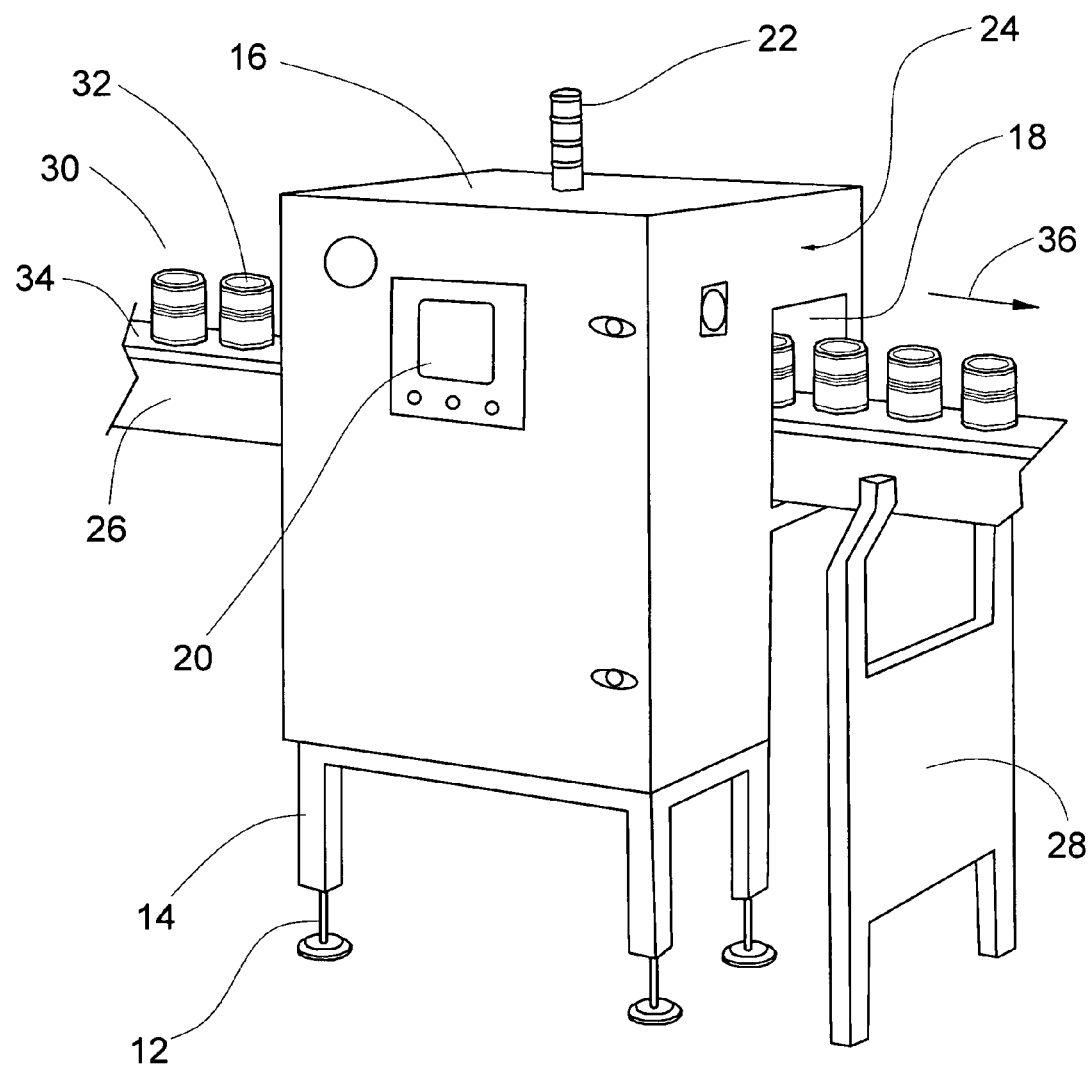
FIG. 1 is an isometric view of the apparatus for detecting foreign material in a product stream of filled and sealed cans.

A preferred embodiment of an apparatus 10 for detecting foreign material in a container is shown in FIG. 1. The apparatus 10 is mounted to a floor or platform using a plurality of support feet 12. The support feet 12 are adjustably mounted to a support frame 14. An enclosure 16 is borne by the support frame 14. A user interface 20 is mounted to the enclosure 20. A series of status lights 22 are also mounted to the enclosure 16.

The enclosure 16 has an aperture 18 which provides a path therethrough. An inspection station 24 is contained within the enclosure 16, and is positioned around the aperture 18 in x-ray transmission relation, and will be discussed in further detail below.

A conveyor frame 26 is held by a conveyor support 28 and extends through the aperture 18. A product stream 30 having a plurality of articles including cans or containers 32 are borne by, and transported with a conveyor belt 34 in a flow direction generally indicated by the numeral 36. The cans or containers 32 range in height from 15 mm to 220 mm and from a diameter of 20 mm to 180 mm. The cans or containers 32 are transported at a speed having a range, and the range extends from a low value of 2 meters per minute to a high value of 250 meters per minute. In this arrangement, cans or containers 32 are transported by the conveyor belt 34 through the aperture 18 and interrogated by the inspection station 24 to identify the presence of foreign material in the cans or containers 32.

Figure 2:
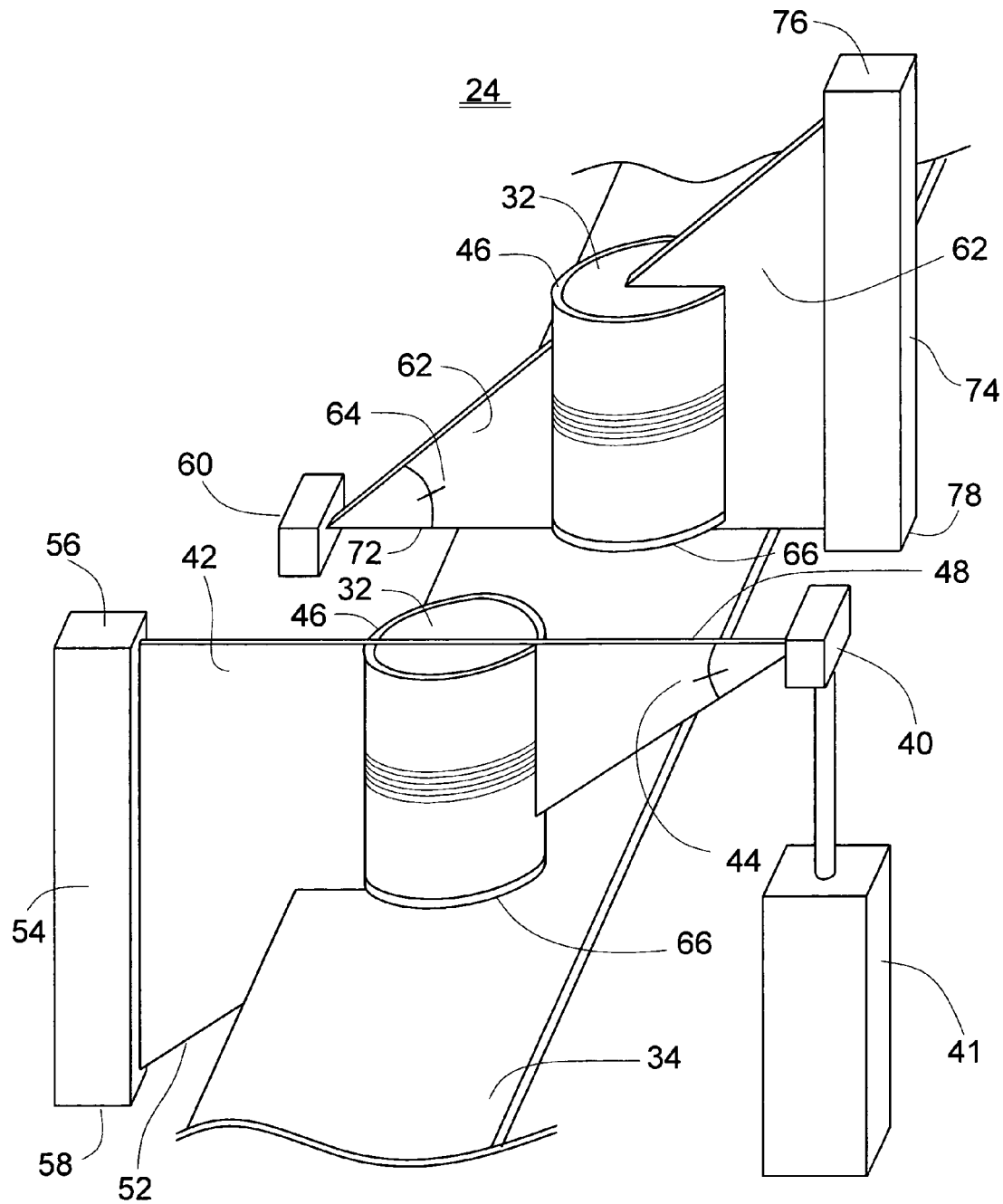
FIG. 2 is an isometric view of a preferred embodiment of the inspection station of the apparatus with an optional actuator.

Now referring to FIG. 2, the inspection station 24 is positioned within the enclosure 16 (FIG. 1) and is positioned in straddling relation to the conveyor belt 34 where cans or containers 32 are transported.

A first x-ray emitter 40 is positioned on adjacent to the conveyor belt 34 and is operable to emit x-ray radiation in a pattern forming a first x-ray beam 42 having a first diverging angle 44. The x-ray emitter 40 is positioned at a height or elevation that is approximate to a top seam 46 of the can or container 32 so that the first x-ray emitter 40 and the top seam 46 of the can or container 32 both border a first horizontal plane 50 (FIG. 4).

Figure 4:
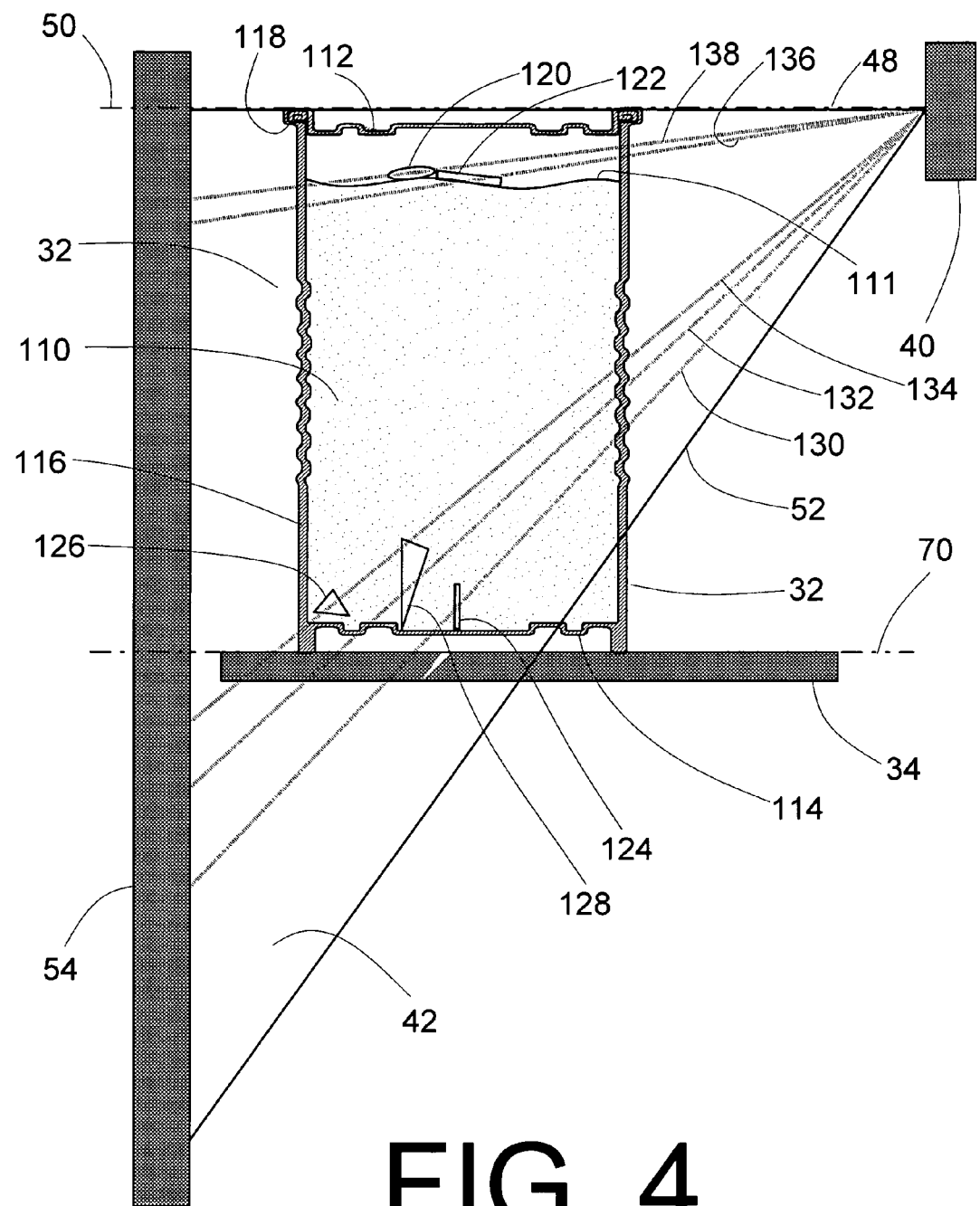
FIG. 4 is a partial cross sectional view of the inspection station with the first x-ray emitter projecting a first x-ray beam through a can containing foreign material to the first sensor array.

The first x-ray emitter 40 is positioned so that an upper edge 48 of the first beam 42 is proximate to the first horizontal plane 50 (FIG. 4). An optional actuator 41 is shown which is utilized to position the emitter 40 at a preset position to enable rapid change over for containers of varying heights. A lower edge 52 of the first beam 42 is positioned in intersecting relation to the can or container 32. In a preferred embodiment, the first x-ray emitter 40 is an x-ray source having a spectral range of 20 to 70 kV.

A first sensor array 54 is positioned in receiving relation to the first x-ray beam 42. A top 56 of the first sensor array 54 is positioned proximate to the first horizontal plane 50. A bottom 58 of the first sensor array 54 is positioned below the conveyor belt 34. In this manner, x-rays originating from the first x-ray emitter 40 are projected through the can or container 32 where they are received and converted into signals by the first sensor array 54.

A second x-ray emitter 60 is positioned adjacent to the conveyor belt 34 that is opposite the first side, and is operable to emit x-ray radiation in a pattern forming a second x-ray beam 62 having a second diverging angle 64. The second x-ray emitter 60 is positioned at a height or elevation that is approximate to a bottom seam 66 of the can or container 32 so that the second x-ray emitter 60 and the bottom seam 66 of the can or container 32 both border a second horizontal plane 70 (FIG. 4). The second x-ray emitter 60 is positioned so that a lower edge 72 of the second x-ray beam 62 is proximate to the second horizontal plane 70 (FIG. 4). An upper edge 68 of the second beam 62 is positioned in intersecting relation to the can or container 32. In a preferred embodiment, the second x-ray emitter 60 is an x-ray source having a spectral range of 20 to 70 kV.

A second sensor array 74 is positioned in receiving relation to the second x-ray beam 62. A bottom 78 of the second sensor array 74 is positioned proximate to the second horizontal plane 70 (FIG. 4). A top 76 of the second sensor array 54 is positioned substantially above the top seam 46 of the can or container 32. In this manner, x-rays originating from the second x-ray emitter 60 are projected through the can or container 32 where they are received and converted into signals by the second sensor array 74.

Figure 3:
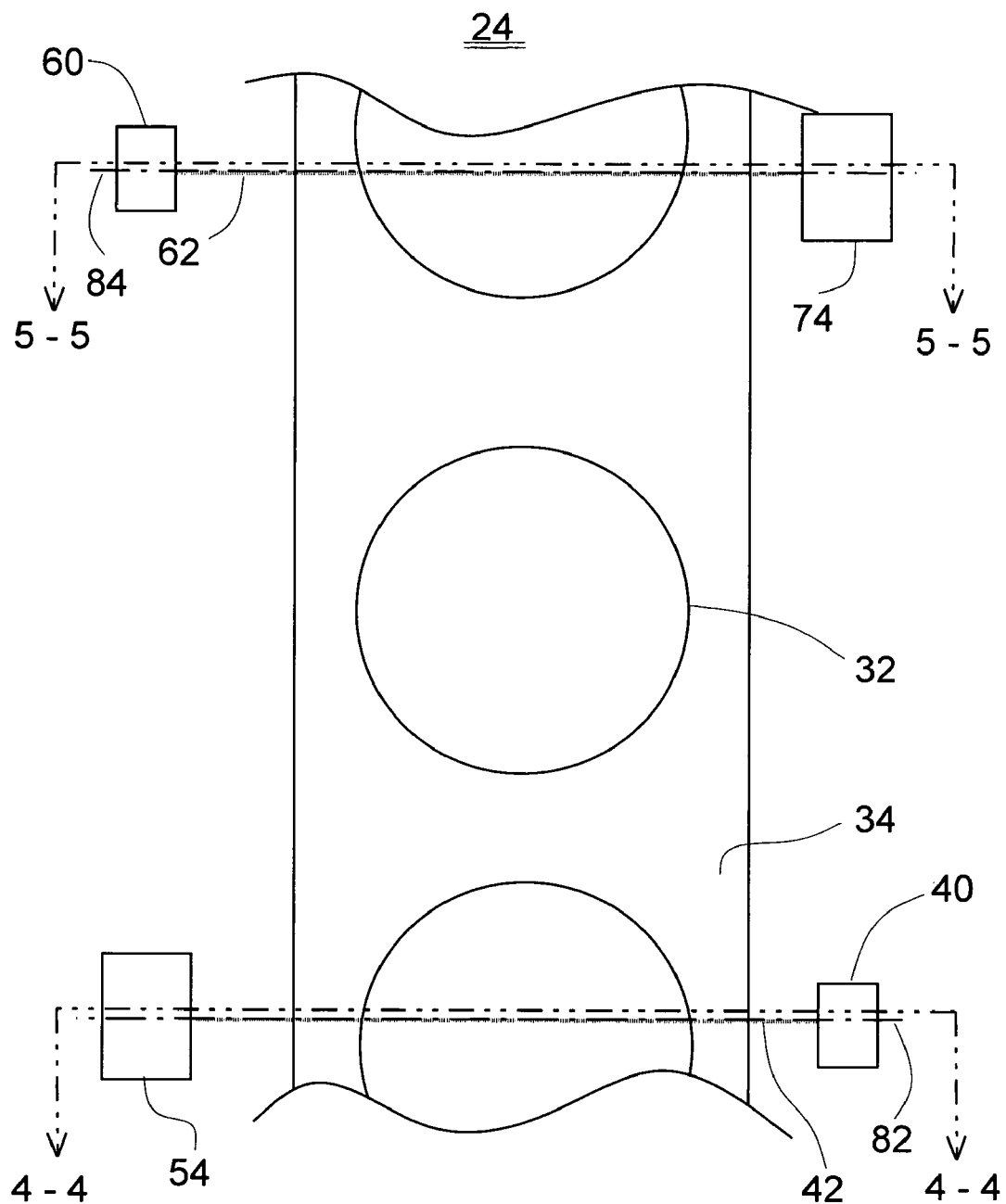
FIG. 3 is a plan view of a preferred embodiment of the inspection station.

Now referring to FIG. 3, the first x-ray beam 42 is oriented in a first vertical plane 82 and the second x-ray beam 62 is oriented in a second vertical plane 84.

Referring now to FIGS. 3 and 4, a can or container 32 is positioned on the conveyor belt 34 and is interrogated by radiation that projects from the first x-ray emitter 40 as the first x-ray beam 42, and through the can or container 32 to the first sensor array 54. A section line 4-4 (FIG. 3) provides an indication of the location and direction of a partial cross sectional view shown in FIG. 4.

Referring now to FIG. 4, the first x-ray emitter 40 provides radiation forming the x-ray beam 42 having the upper edge 48 and lower edge 52. The upper edge 48 lies proximate to the first horizontal plane 50.

The can or container 32 contains desirable contents 110 having a top surface 111 inside the can or container 32. The container is formed having a cylindrical wall 116, a bottom 114, and a lid 112. The bottom 114 and lid 112 each have concentric grooves formed therein to provide rigidity. The lid 112 often includes a pull tab (not shown) to facilitate opening. The cylindrical wall 116 includes a series of corrugations formed therein to strengthen the container 32. The lid 112 is sealably attached to the wall 116 by means of a seam 118.

The x-ray beam 42 is composed of a plurality of rays, each projecting from the first x-ray emitter 40. Several of these rays are enumerated as 130, 132, 134, 136, and 138 for discussion purposes, and will be discussed in more detail below.

Figure 5:
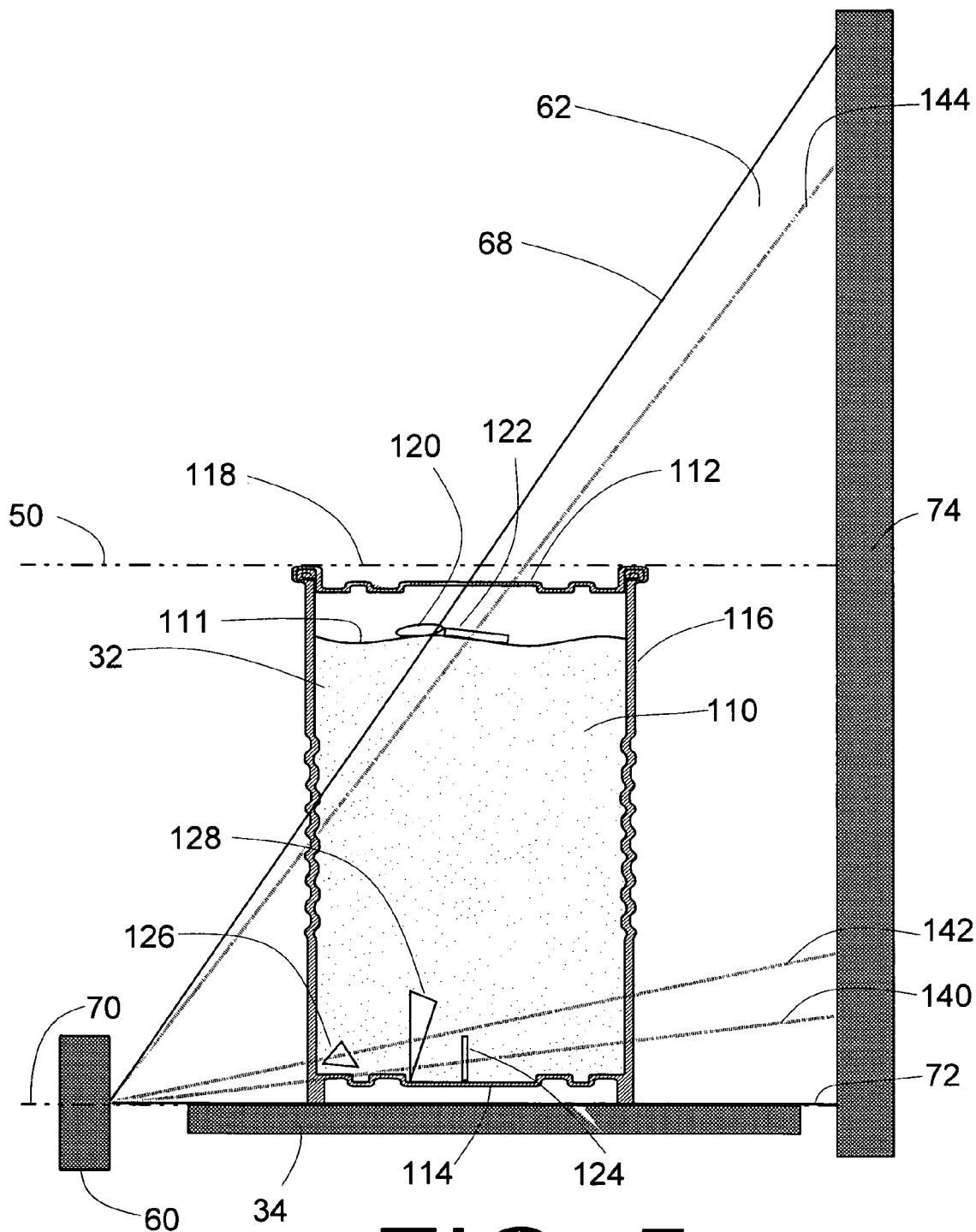
FIG. 5 is a partial cross sectional view of the inspection station with the second x-ray emitter projecting a second x-ray beam through a can containing foreign material to the second sensor array.

Referring to FIGS. 3 and 5, a can or container 32 is positioned on the conveyor belt 34 and is interrogated by radiation that projects from the second x-ray emitter 60 as the second x-ray beam 62, and through the can or container 32 to the second sensor array 74. A section line 5-5 (FIG. 3) provides an indication of the location and direction of a partial cross sectional view shown in FIG. 5.

Referring now to FIGS. 4 and 5, several pieces of undesirable or pieces of foreign material are shown suspended or submerged in the contents 110 of the can or container 32 and are represented by the numerals 120, 122, 124, 126, and 128. These undesirable or foreign materials includes, but is not limited to, shards of glass, metal fragments, stones, rubber pieces, hard plastic, or bones.

Referring now to FIG. 5, the second x-ray emitter 60 provides radiation that projects the x-ray beam 62 forming the upper edge 68 and lower edge 72. The lower edge 72 lies proximate to the second horizontal plane 70.

The second x-ray beam 62 is composed of a plurality of rays, each projecting from the second x-ray emitter 60, several of which are enumerated as 140, 142 and 144, and will be discussed in more detail below.

Figure 6:
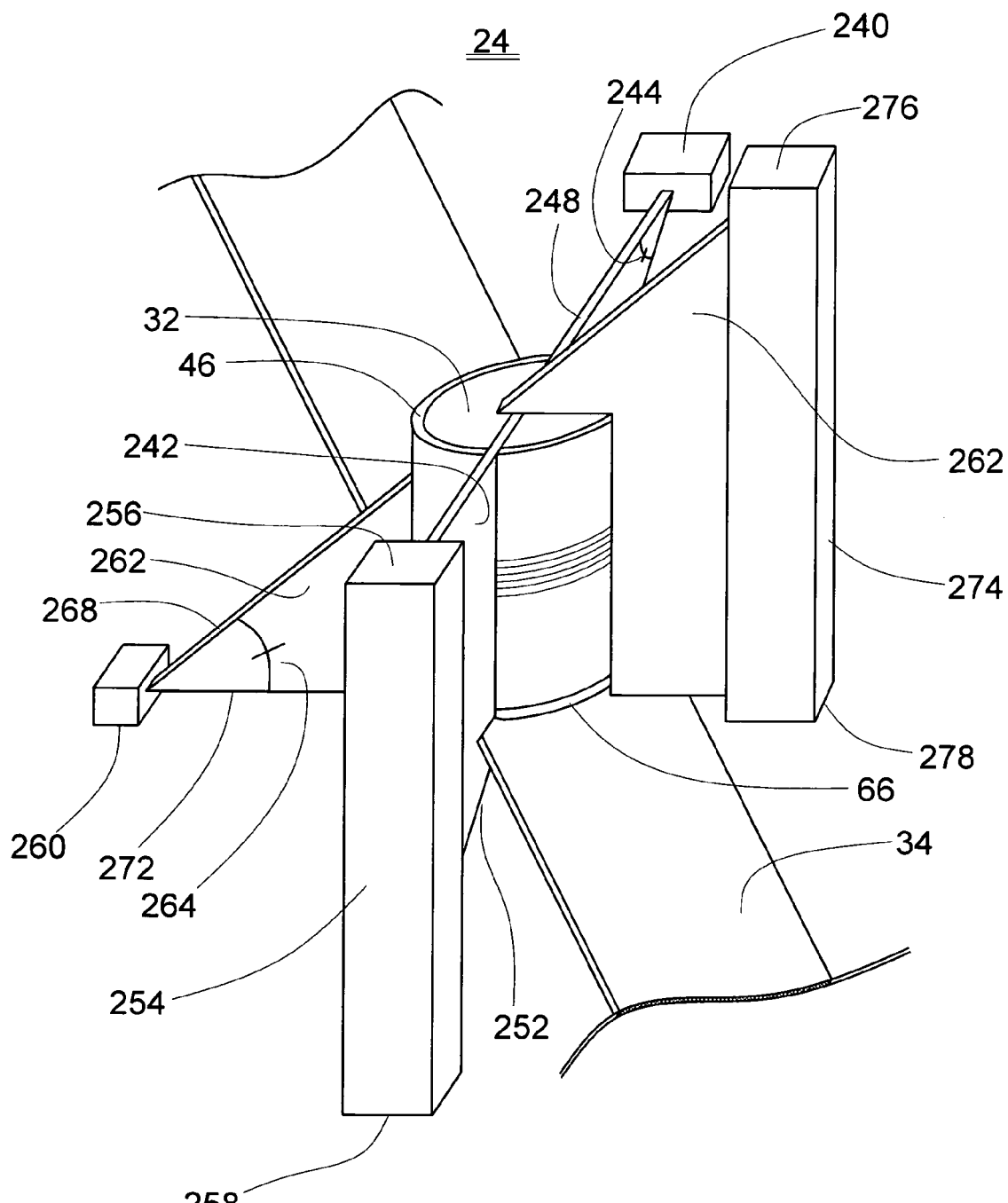
FIG. 6 is an isometric view of an alternate embodiment of the inspection station of the apparatus.

Now referring to FIG. 6, an alternate embodiment of the inspection station 24 is positioned within the enclosure 16 (FIG. 1) and is positioned in straddling relation to the conveyor belt 34 where cans or containers 32 are transported.

Figure 8:
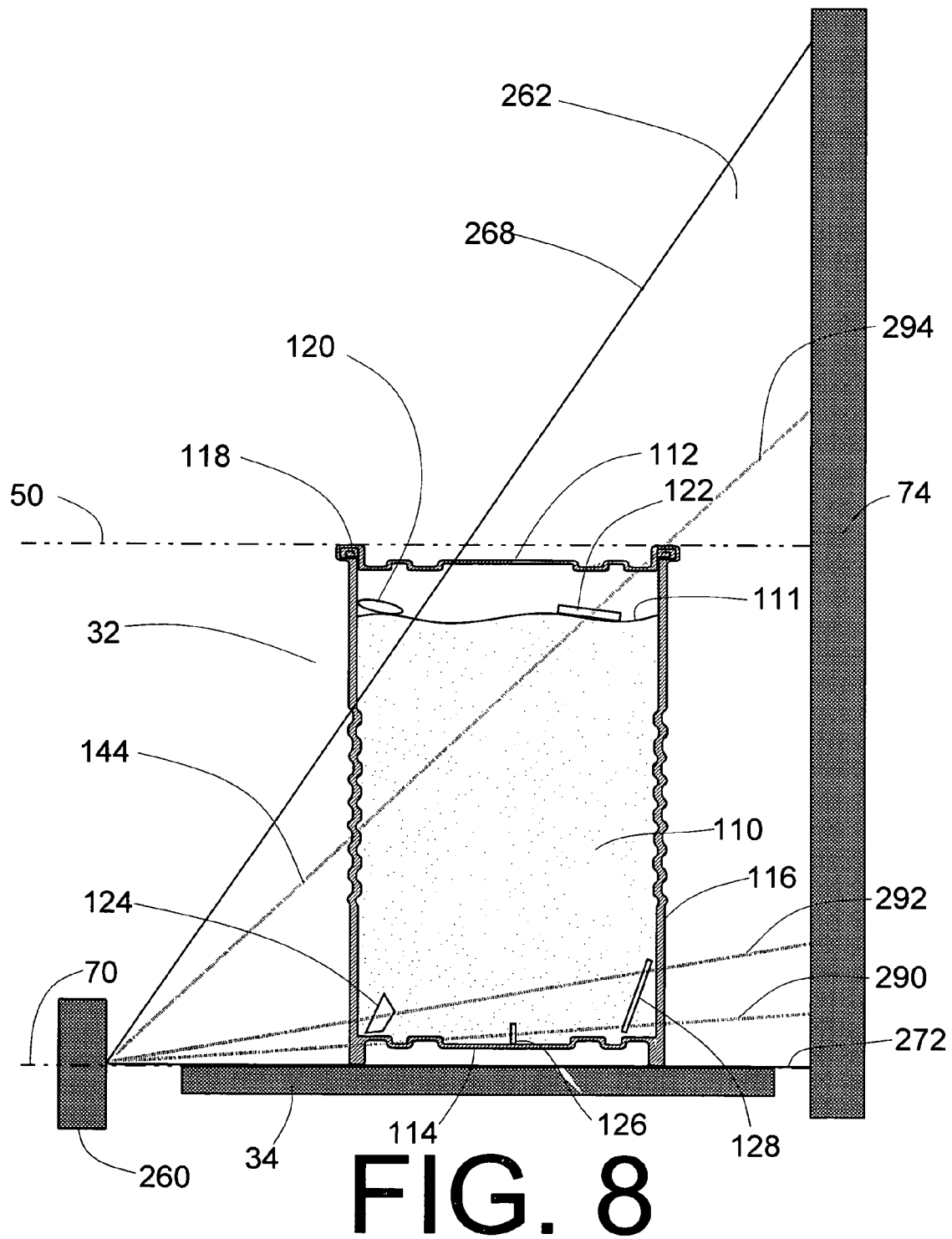
FIG. 8 is a partial cross sectional view of the alternate embodiment of the inspection station with the second x-ray emitter projecting a second x-ray beam through a can containing foreign material to the second sensor array.

A first x-ray emitter 240 is positioned on a first side of the conveyor belt 34 and is operable to emit x-ray radiation in a pattern forming a first x-ray beam 242 having a first diverging angle 244. The x-ray emitter 240 is positioned at a height or elevation that is approximate to the top seam 46 of the can or container 32 so that the first x-ray emitter 240 and the top seam 46 of the can or container 32 both border the first horizontal plane 50 (FIG. 8). The first x-ray emitter 240 is positioned so that an upper edge 248 of the first beam 242 is proximate to the first horizontal plane 50 (FIG. 8). A lower edge 252 of the first beam 242 is positioned in intersecting relation to the can or container 32. In a preferred embodiment, the first x-ray emitter 240 is an x-ray source having a spectral range of 20 to 70 kV.

A first sensor array 254 is positioned in receiving relation to the first x-ray beam 242. A top 256 of the first sensor array 254 is positioned proximate to the first horizontal plane 50. A bottom 258 of the first sensor array 254 is positioned below the conveyor belt 34. In this manner, x-rays originating from the first x-ray emitter 240 are projected through the can or container 32 where they are received and converted into signals by the first sensor array 254.

A second x-ray emitter 260 is positioned on second side of the conveyor belt 34 that is opposite the first side, and is operable to emit x-ray radiation in a pattern forming a second x-ray beam 262 having a second diverging angle 264. The second x-ray emitter 260 is positioned at a height or elevation that is approximate to the bottom seam 66 of the can or container 32 so that the second x-ray emitter 260 and the bottom seam 66 of the can or container 32 both border the second horizontal plane 70 (FIG. 8). The second x-ray emitter 260 is positioned so that a lower edge 272 of the second x-ray beam 262 is proximate to the second horizontal plane 270 (FIG. 8). An upper edge 268 of the second beam 62 is positioned in intersecting relation to the can or container 32. In a preferred embodiment, the second x-ray emitter 60 is an x-ray source having a spectral range of 20 to 70 kV.

A second sensor array 274 is positioned in receiving relation to the second x-ray beam 262. A bottom 278 of the second sensor array 274 is positioned proximate to the second horizontal plane 70 (FIG. 8). A top 276 of the second sensor array 254 is positioned substantially above the top seam 46 of the can or container 32. In this manner, x-rays originating from the second x-ray emitter 260 are projected through the can or container 32 where they are received and converted into signals by the second sensor array 274.

Figure 7:
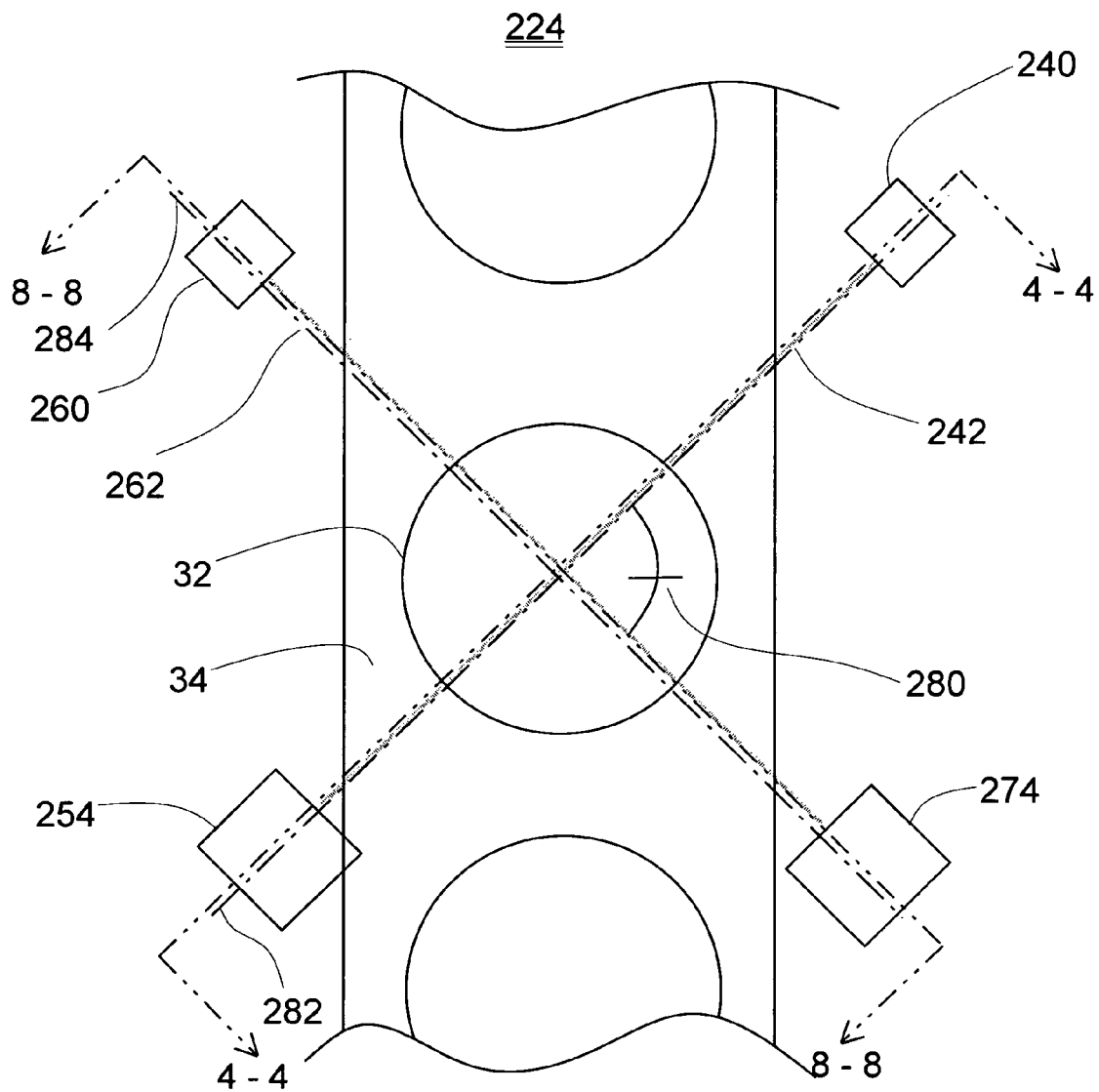
FIG. 7 is a plan view of an alternate embodiment of the inspection station.

Now referring to FIG. 7, the first x-ray beam 242 is oriented in a first vertical plane 282 and the second x-ray beam 262 is oriented in a second vertical plane 284. The first x-ray beam 242 and the second x-ray beam 262 are arranged at an angle 280 relative one to another.

The can or container 32 is positioned on the conveyor belt 34 and is interrogated by radiation that projects from the first x-ray emitter 240 as the first x-ray beam 242, and through the can or container 32 to the first sensor array 254. The section line 44 (FIG. 7) provides an indication of the location and direction of the partial cross sectional view shown in FIG. 4 referred to earlier in this specification.

Referring to FIGS. 7 and 8, the can or container 32 is positioned on the conveyor belt 34 and is interrogated by radiation that projects from the second x-ray emitter 260 as the second x-ray beam 262, and through the can or container 32 to the second sensor array 274. A section line 8-8 (FIG. 7) provides an indication of the location and direction of a partial cross sectional view shown in FIG. 8.

Referring now to FIG. 8, the second x-ray emitter 260 provides radiation that projects the x-ray beam 262 forming the upper edge 268 and lower edge 272. The lower edge 272 lies proximate to the second horizontal plane 70.

Also shown in FIG. 8, are corresponding views of the undesirable or foreign material represented by the numerals 120, 122, 124, 126, and 128.

The second x-ray beam 262 is composed of a plurality of rays, each projecting from the second x-ray emitter 260, several of which are enumerated as 290, 292 and 294, and will be discussed in more detail below.

Operation

The operation of the present invention is believed to be readily apparent and is briefly summarized in the paragraphs which follow.

In operation, the product stream 30 having the plurality of cans or containers 32 is conveyed or transported by the conveyor belt 34 in the flow direction generally indicated by the numeral 36. The cans or containers 32 are conveyed through an aperture 18 in the apparatus for detecting foreign material 10 so that they can be interrogated by the inspection station 24.

The inspection station 24 is operable to interrogate cans or containers 32 in the product stream 30 using through-transmission and reception of X-rays that have been propagated through the containers 32 as that are transported by the conveyor belt 34. The inspection station 24 includes a first X-ray emitter 40 that is located proximate to the first horizontal plane 50 which coincides with the top seam 46 of the container 32. The position of the first X-ray emitter 40 is optionally set by the actuator 41. A second x-ray emitter 60 that is located proximate to the second horizontal plane 70. The first x-ray beam 42 originates from the first x-ray emitter 40 and is aligned with the first vertical plane 82, and is directed in a diverging manner toward the second horizontal plane 70.

The second x-ray beam 62 originates from the second x-ray emitter 60 and is aligned with the second vertical plane 84, and is directed in a diverging manner toward the first horizontal plane 50.

The first X-ray beam 42 propagates through the container 32 and its contents 110, and is received by the first sensor array 54 where a signal is provided representing the magnitude of received X-rays over the length of the array according to a manner that is well known in the art. These signals are processed with known thresholds to make a determination whether foreign material exists in the container 32.

Referring to FIG. 4, the first x-ray beam 42 comprises a plurality of rays, of which several are illustrated for discussion.

Ray 130 originates from the first X-ray emitter 40 and travels through a corrugated section of the cylindrical wall 116 of the container 32. Here, some of the energy is diffracted, but a substantial portion continues to travel in the manner illustrated in the figure as it travels through the contents 110 of the container 32. The ray 130 interacts with a portion of the foreign material piece 124 where some of the energy is reflected or refracted or absorbed. A portion of the energy continues to travel as illustrated in the figure and passes through the bottom 114 of the container, and finally is received by the first sensor array 54.

Another ray, 132 similarly originates from the first x-ray emitter 40 and interacts with the cylindrical wall 116, and with the contents 110, and then encounters a piece of foreign material 128. Then, a portion of the energy travels through the bottom 114 of the container 32 and finally is received by another portion of the first sensor array 54.

Yet another ray 134 also originates from the first x-ray emitter 40, and then encounters the cylindrical wall 116, then traveling through the contents 110 where it interacts with pieces of foreign material 128 and 127. Then the ray 134 emerges through a corner in the container 32 where it is received by yet another portion of the first sensor array.

Another ray 136 is transmitted by the first x-ray emitter 40 and passes through the cylindrical wall 116 and then encounters a piece of foreign material 122 that is floating on the surface 111 of the contents 110. Then, the ray 136 passes through the contents 110, and through the cylindrical wall 116, finally being received by another portion the first sensor array 54.

Finally, a ray 138 is sent by the first x-ray emitter 40, and through the cylindrical wall 116, and then it interacts with another piece of floating foreign material 120. Then, the ray grazes the surface 111 and travels through the cylindrical wall 116 where it emerges and is received by a portion of the first sensor array 54.

Referring to FIG. 5, the second x-ray beam 62 comprises a plurality of rays, of which several are illustrated for discussion below.

Ray 140 originates from the second X-ray emitter 60 and travels through a corner of the container 32. Here, some of the energy is diffracted, but a substantial portion continues to travel in the manner illustrated in the figure as it travels through the bottom 114 in a substantially absorbing and diffracting manner. Then, a lesser portion of the original ray 140 interacts with the foreign material piece 126 where some of the energy is reflected or refracted or absorbed. A portion of the energy continues to travel as illustrated in the figure and passes through the cylindrical wall 116 of the container 32 where it is finally received by the second sensor array 74. One skilled in the art would recognize that the magnitude of X-rays of the ray 140 received at the second sensor array 74 would be greatly attenuated from an original magnitude present as the ray emerged from the second X-ray emitter 60. A careful inspection of FIG. 4 in comparison to FIG. 5 reveals that ray 134 of FIG. 4 is able to more effectively interrogate and to reveal the presence of the piece of foreign material 126 than the ray 140 as shown in FIG. 5.

Another ray 142 similarly originates from the second x-ray emitter 60 and interacts with the cylindrical wall 116, then encounters the piece of foreign material 126. Then, a portion of the energy travels through the contents 110 and interacts with a portion of the piece of foreign material 128. Finally, the ray 142 passes through the cylindrical wall 116 of the container 32 and emerges to be received by another portion of the second sensor array 74. A careful inspection of FIG. 4 and FIG. 5 reveals that the ray 142 (FIG. 5) is more effective in indicating the presence of the piece of foreign material 124 than the ray 124 (FIG. 4) because the ray 124 interacts with corrugations in the cylindrical wall 116 and the bottom 114 significantly confounding the signal.

Finally, another ray 144 also originates from the second x-ray emitter 60 and encounters a corrugated portion of the cylindrical wall 116, and then travels through the contents 110 where it interacts with a piece of foreign material 122 that is floating on the surface 111. Then the ray 144 interacts with a seam 118 of the container 32, finally emerging where it is received by yet another portion of the second sensor array 74. A careful inspection of FIGS. 4 and 5 reveals that the ray 136 (FIG. 4) will more accurately reveal the presence of the piece of foreign material 122 than the ray 144 (FIG. 5) which will be attenuated by a greater degree because of an interaction with a corrugated section of the cylindrical wall 116, a longer path through the contents 110, and more importantly, the seam 118.

Another further example of the operation of the inspection station 24 includes a discussion of the alternate embodiment shown in FIG. 6. Here, the inspection station 24 includes a first X-ray emitter 240 that is located proximate to the first horizontal plane 50 and a second x-ray emitter 260 that is located proximate to the second horizontal plane 70. The first x-ray beam 242 originates from the first x-ray emitter 240 and is aligned with the first vertical plane 282, and is directed in a diverging manner toward the second horizontal plane 70.

The second x-ray beam 262 originates from the second x-ray emitter 260 and is aligned with the second vertical plane 284, and is directed in a diverging manner toward the first horizontal plane 50.

The first X-ray beam 242 propagates through the container 32 and its contents 110, and is received by the first sensor array 254 where a signal is provided representing the magnitude of received X-rays over the length of the array according to a manner that is well known in the art. These signals are processed with known thresholds to make a determination whether foreign material exists in the container 32.

The interaction of the first x-ray beam has been previously discussed as described in FIG. 4.

Referring now to FIG. 8, the second x-ray beam 262 comprises a plurality of rays, of which several are illustrated for discussion below.

Ray 290 originates from the second X-ray emitter 260 and travels through a corner of the container 32. Here, some of the energy is diffracted, but a substantial portion continues to travel in the manner illustrated in the figure as it travels through the bottom 114 in a substantially absorbing and diffracting manner. Then, a lesser portion of the original ray 140 interacts with the foreign material pieces 126 and 128 where some of the energy is reflected or refracted or absorbed. A portion of the energy continues to travel as illustrated in the figure and passes through the cylindrical wall 116 of the container 32 where it is finally received by the second sensor array 274. One skilled in the art would recognize that the magnitude of X-rays of the ray 290 received at the second sensor array. 274 would be greatly attenuated from an original magnitude present as the ray emerged from the second X-ray emitter 260. A careful inspection of FIG. 4 in comparison to FIG. 8 reveals that ray 134 of FIG. 4 is able to more effectively interrogate and to reveal the presence of the piece of foreign material 126 than the ray 140 as shown in FIG. 8.

Another ray 292 similarly originates from the second x-ray emitter 260 and interacts with the cylindrical wall 116, then encounters the piece of foreign material 124. Then, a portion of the energy travels through the contents 110 and interacts with a portion of the piece of foreign material 128. Finally, the ray 292 passes through the cylindrical wall 116 of the container 32 and emerges to be received by another portion of the second sensor array 274. A careful inspection of FIG. 4 and FIG. 8 reveals that the ray 292 is more effective in detecting the presence of the piece of foreign material 124 than the ray 130 (FIG. 4) because the ray 130 interacts with corrugations in the cylindrical wall 116 and the bottom 114 significantly confounding the signal.

Finally, another ray 294 also originates from the second x-ray emitter 260 and encounters a corrugated portion of the cylindrical wall 116, and then travels through the contents 110 where it interacts with a piece of foreign material 122 that is floating on the surface 111. Then the ray 294 interacts with a seam 118 of the container 32, finally emerging where it is received by yet another portion of the second sensor array 74. A careful inspection of FIGS. 4 and 8 reveals that the ray 136 (FIG. 4) will more accurately reveal the presence of the piece of foreign material 122 than the ray 294 (FIG. 8) which will be attenuated by a greater degree because of an interaction with a corrugated section of the cylindrical wall 116, a longer path through the contents 110, and more importantly, the seam 118.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An apparatus for detecting the presence of a foreign object in a can, and wherein the can has a top seam bordering a first horizontal plane, and a bottom seam bordering a second horizontal plane, the apparatus comprising:
   a conveyor configured to transport the can;
   a first x-ray emitter located proximate to the first horizontal plane, and configured to project a first diverging x-ray beam in a first vertical plane through the can as it is transported by the conveyor;

a first sensor array positioned in receiving relation to the first x-ray beam after the first x-ray beam has interacted with the can;

a second x-ray emitter located proximate to the second horizontal plane, and configured to project a second diverging x-ray beam in a second vertical plane through the can as it is transported by the conveyor; and a second sensor array positioned in receiving relation to the second x-ray beam after the second x-ray beam has interacted with the can.

2. The apparatus for detecting the presence of a foreign object in a can as claimed in claim 1, and wherein a portion of the first x-ray beam is directed in a parallel manner relative to the first horizontal plane, and a portion of the first x-ray beam is directed in intersecting relation to the second horizontal plane.

3. The apparatus for detecting the presence of a foreign object in a can as claimed in claim 2, and wherein the first sensor array extends from the first horizontal plane to a point below the second horizontal plane.

4. The apparatus for detecting the presence of a foreign object in a can as claimed in claim 3, and wherein a portion of the second x-ray beam is directed in a parallel manner relative to the second horizontal plane, and a portion of the second x-ray beam is directed in intersecting relation to the first horizontal plane.

5. The apparatus for detecting the presence of a foreign object in a can as claimed in claim 4, and wherein the second sensor array extends from the second horizontal plane to a point substantially above the first horizontal plane.

6. The apparatus for detecting the presence of a foreign object in a can as claimed in claim 5, and wherein the first and second vertical planes are oriented in substantially parallel relation.

7. The apparatus for detecting the presence of a foreign object in a can as claimed in claim 5, and wherein the first and second vertical planes are oriented in substantially perpendicular relation.

8. The apparatus for detecting the presence of a foreign object in a can as claimed in claim 1, and wherein the first x-ray emitter is positioned by an actuator.

9. A method for detecting the presence of a foreign object in a can, comprising:

providing a can having a top seam bordered by a first horizontal plane and a bottom seam bordered by a second horizontal plane;

providing a first x-ray emitter located proximate to the first horizontal plane;

providing a second x-ray emitter located proximate to the second horizontal plane;

transporting the can;

directing a first x-ray beam from the first x-ray emitter in a first vertical plane, and toward the second horizontal plane in a diverging manner; and directing a second x-ray beam from the second x-ray emitter in a second vertical plane, and toward the first horizontal plane in a diverging manner.

10. The method as claimed in claim 9, and wherein the first x-ray beam is bound by the first horizontal plane.

11. The method as claimed in claim 10, and wherein the second x-ray beam is bound by the second horizontal plane.

12. The method as claimed in claim 11, further comprising:

providing a first sensor array;

providing a second sensor array;

receiving the first x-ray beam from the first x-ray emitter after interacting with the can; and receiving the second x-ray beam from the second x-ray emitter after interacting with the can.

* * * * *